(12) United States Patent
Laeng et al.

(10) Patent No.: US 11,569,677 B2
(45) Date of Patent: Jan. 31, 2023

(54) CHARGING SYSTEM

(71) Applicant: Bucher Hydraulics AG, Neuheim (CH)

(72) Inventors: Bernhard Laeng, Romanshorn (CH);
Alex Itten, Romanshorn (CH);
Benjamin Faessler, Waldstatt (CH)

(73) Assignee: Bucher Hydraulics AG, Neuheim (CH)

( * ) Notice: Subject to any disclaimer, the term of this patent is extended or adjusted under 35 U.S.C. 154(b) by 171 days.

(21) Appl. No.: 16/977,148

(22) PCT Filed: Feb. 28, 2019

(86) PCT No.: PCT/EP2019/055073
§ 371 (c)(1),
(2) Date: Sep. 1, 2020

(87) PCT Pub. No.: WO2019/166592
PCT Pub. Date: Sep. 6, 2019

(65) Prior Publication Data
US 2021/0066954 A1 Mar. 4, 2021

(30) Foreign Application Priority Data
Mar. 2, 2018 (DE) .................... 10 2018 203 192.4

(51) Int. Cl.
*H02J 7/06* (2006.01)
*H02J 7/00* (2006.01)
*H02M 7/5387* (2007.01)

(52) U.S. Cl.
CPC .............. *H02J 7/06* (2013.01); *H02J 7/0013* (2013.01); *H02M 7/5387* (2013.01); *H02J 2207/20* (2020.01)

(58) Field of Classification Search
CPC ........ H02J 7/06; H02J 7/0013; H02J 2207/20; H02M 7/5387
See application file for complete search history.

(56) References Cited

U.S. PATENT DOCUMENTS 4,920,475 A * 4/1990 Rippel .................... B60L 50/51
363/137
9,748,865 B2 * 8/2017 Ayai .................... H02M 7/5387
(Continued)

FOREIGN PATENT DOCUMENTS

DE   10 2011 118 823 A1   5/2013
DE   10 2016 209 905 A1   12/2016
(Continued)

OTHER PUBLICATIONS

International Search Report (PCT/ISA/210) issued in PCT Application No. PCT/EP2019/055073 dated May 16, 2019 with English translation (five pages).
(Continued)

*Primary Examiner* — Richard Isla
*Assistant Examiner* — Sadia Kousar
(74) *Attorney, Agent, or Firm* — Crowell & Moring LLP (57) ABSTRACT

A charging system has: a number of connections for connecting at least one electric energy store to be charged; a number n of at least three inverter bridges, each of which has a center tap; a number n of electric filters, wherein the input of each filter of the number n of filters is electrically connected to a respective corresponding center tap of an inverter bridge of the number of inverter bridges; a controllable assigning unit which is inserted between a respective output of a filter of the number n of filters and the number of connections and which is designed to electrically assign the output of each filter of the number n of filters to a respective corresponding connection of the number of connections depending on at least one actuation signal; and a control unit which is designed to generate the at least one actuation signal depending on a desired charge mode of the charging system.

9 Claims, 5 Drawing Sheets

(56) References Cited

U.S. PATENT DOCUMENTS

| | | |
|---|---|---|
| 2013/0069592 A1 | 3/2013 | Bouman |
| 2013/0103191 A1 | 4/2013 | Bouman |
| 2018/0037121 A1 | 2/2018 | Narla |
| 2018/0212438 A1 | 7/2018 | Bouman |
| 2019/0305690 A1* | 10/2019 | Kusch ............... H02M 7/53875 |
| 2020/0328686 A1* | 10/2020 | Camiolo ............... H02J 7/0045 |
| 2021/0066954 A1* | 3/2021 | Laeng ................... H02J 7/0013 |

FOREIGN PATENT DOCUMENTS

| | | | | |
|---|---|---|---|---|
| DE | 102016209905 A1 * | 12/2016 | .......... | B60L 11/1803 |
| DE | 10 2016 218 304 B3 | 2/2018 | | |
| DE | 102016218304 B3 * | 2/2018 | .............. | B60L 53/24 |
| NL | 2004279 C | 8/2011 | | |
| RU | 2681839 C1 * | 3/2019 | | |
| WO | WO 2011/145939 A2 | 11/2011 | | |

OTHER PUBLICATIONS

German-language Written Opinion (PCT/ISA/237) issued in PCT Application No. PCT/EP2019/055073 dated May 16, 2019 (seven pages).

* cited by examiner

CHARGING SYSTEM

BACKGROUND AND SUMMARY OF THE INVENTION

The invention relates to a charging system.

The object of the invention is the provision of a charging system, by means of which different types of electrical energy accumulators can be charged in the most flexible manner possible.

The invention fulfils this object by means of a charging system according to the independent claims.

The charging system comprises a whole number m of connections for connecting at least one electric energy receiving accumulator (hereinafter "electric energy accumulator") to be charged which, for example, for the purposes of charging, can draw electrical energy from an electrical energy supply accumulator. The number m, for example, can lie between 2 and 20. The electric energy accumulator can be a constituent element of an "IT system" ("Isolé Terre"="Isolated ground"). A single connection can constitute a single electric pole. Three connections or poles of this type can be combined, for example, to constitute a three-phase connection or a three-phase AC connection. Additionally to the three connections, for example, a neutral conductor connection and a PE connection can be further constituent elements of a three-phase AC connection of this type, wherein the neutral conductor connection and the PE connection can be executed separately from the remaining connections.

The charging system further comprises a number n of at least three two-level or multi-level inverter bridges, i.e. n≥3. The charging system preferably comprises a number n of at least six two-level or multi-level inverter bridges, i.e. n≥6. Each of the inverter bridges conventionally comprises a center tap. Conventionally, the inverter bridges can further comprise at least two series-connected and actuatable switching devices, wherein the respective center tap, depending upon a circuit state of the switching devices, is electrically connected to either one or the other outer end of a respective inverter bridge. In this respect, reference may also be made to the relevant specialized literature concerning inverters and their inverter bridges.

The charging system further comprises a number n of single- or multi-phase electric filters, wherein one input of a respective filter of the number n of filters is electrically connected to a respectively associated center tap of an associated inverter bridge of the number of inverter bridges.

The charging system further comprises a controllable assigning unit or switching matrix, which is interpolated between a respective output of one filter of the number n of filters and the number m of connections and is designed, depending upon at least one actuation signal, i.e. one or more actuation signals, to electrically assign a respective output of one filter of the number n of filters to a respectively associated connection of the number m of connections, or to electrically connect a respective output of one filter of the number n of filters to a respectively associated connection of the number m of connections. In this assignment, exactly one connection of the number m of connections can be assigned to exactly one associated output of one filter. In this assignment, one connection of the number m of connections can also be assigned to a plurality of associated outputs of a plurality of filters, i.e. a plurality of filter outputs can be assigned to the same connection, or can be electrically connected to the same connection.

The terms input and output of a respective filter are employed solely for the purposes of distinction between different connections of the filters. A signal flux and/or an energy flux can proceed either from the input of the respective filter in the direction of the output of the respective filter, or from the output of the respective filter in the direction of the input of the respective filter.

The charging system further comprises a control unit, for example in the form of a microprocessor, which is designed to generate the actuation signal(s) in accordance with a desired charging mode of the charging system. The function of the control unit can be divided, for example, between one or more control units.

According to one embodiment, the charging system comprises one or more electrical energy supply accumulators. The energy supply accumulator(s) can be embodied, for example, in the form of rechargeable electrochemical energy accumulators or batteries.

In this case, each of the inverter bridges is supplied by the energy supply accumulator, i.e., for example, a voltage can be applied to their outer ends which is generated by electrical energy of the energy supply accumulator, or which constitutes a voltage which is output or delivered by the electrical energy accumulator. The supply voltage can also be described as an intermediate circuit voltage. A positive intermediate circuit potential, for example, can be applied to one of the outer ends of a respective inverter bridge, and a negative intermediate circuit potential, for example, can be applied to the other outer end of a respective inverter bridge, wherein the potential difference between the positive intermediate circuit potential and the negative intermediate circuit potential constitutes the intermediate circuit voltage which corresponds to the voltage output which is delivered by the electrical energy accumulator.

Additionally or alternatively to the energy supply accumulator, a supply voltage and/or a supply current for the inverter bridges can also be generated by means of an electric generator, which is driven, for example, by means of a combustion engine.

According to one embodiment, a respective filter of the number n of filters comprises at least one reactance coil and at least one capacitor. The filters or reactance coil(s) and the capacitor or capacitors can be interconnected, for example, in an L, T or PI topology.

According to one embodiment, the desired charging mode is selected from the following series of charging modes:
a) simultaneous charging of a plurality of electric energy accumulators with alternating current (for example, single-phase or three-phase),
b) charging of at least one electric energy accumulator with alternating current (for example, single-phase or three-phase), wherein a charging current in charging mode b) is higher than a charging current in charging mode a),
c) simultaneous charging of a plurality of electric energy accumulators with direct current,
d) charging of at least one electric energy accumulator with direct current, wherein a charging current in charging mode d) is higher than a charging current in charging mode c).

According to one embodiment, the control unit is designed to generate the at least one actuation signal for the controllable assigning unit and further actuation signals for switching devices of the inverter bridges, such that the energy supply accumulator is charged by means of electrical energy which is made available on one or more connections of the number m of connections.

According to one embodiment, the control unit is designed to generate the at least one actuation signal for the controllable assigning unit and further actuation signals for switching devices of the inverter bridges, such that electrical energy which is stored in the energy supply accumulator is injected into an electricity supply grid, which is connected to one connection or to a plurality of connections of the number m of connections. The electricity supply grid can be, for example, a conventional single-phase or three-phase AC voltage grid.

According to one embodiment, the energy supply accumulator supplies a voltage at a level which is higher than the level of a voltage which is typically delivered by a charging energy accumulator. For example, a typical level which is delivered by the energy supply accumulator can be greater than 600 V, particularly greater than 750 V, and particularly equal to or greater than 800 V. The level which is delivered by the energy supply accumulator can be greater than √2 times an r.m.s. value of an AC voltage of an electricity supply grid which is connected to a connection or to a plurality of connections of the number m of connections.

On the grounds that, in principle, each inverter can function as a step-down converter, any voltages can be generated from the voltage which is supplied by means of the energy supply accumulator (described hereinafter as the battery voltage) which are lower than the battery voltage. During the charging of the energy supply accumulator, in turn, an inverter bridge can function as a step-up converter wherein, for example, electrical energy from a grid with a lower voltage rating of 400 V or 480 V is converted into a higher battery voltage.

According to one embodiment, the controllable assigning unit comprises a number of actuatable switching devices. The number of actuatable switching devices can be dependent upon the number n and the number m. In a maximum stage of development, with a maximum number of degrees of freedom in assignment, an n×m switching matrix can be constituted, in which each output of a filter can be connected to any desired output of the charging system. In order to reduce the number of actuatable switching devices, the degrees of freedom in assignment can be reduced.

According to one embodiment, the actuatable switching devices are contactors.

The invention is described in detail hereinafter, with reference to the drawings.

DETAILED DESCRIPTION OF THE DRAWINGS

Figures 1, 2, 4:
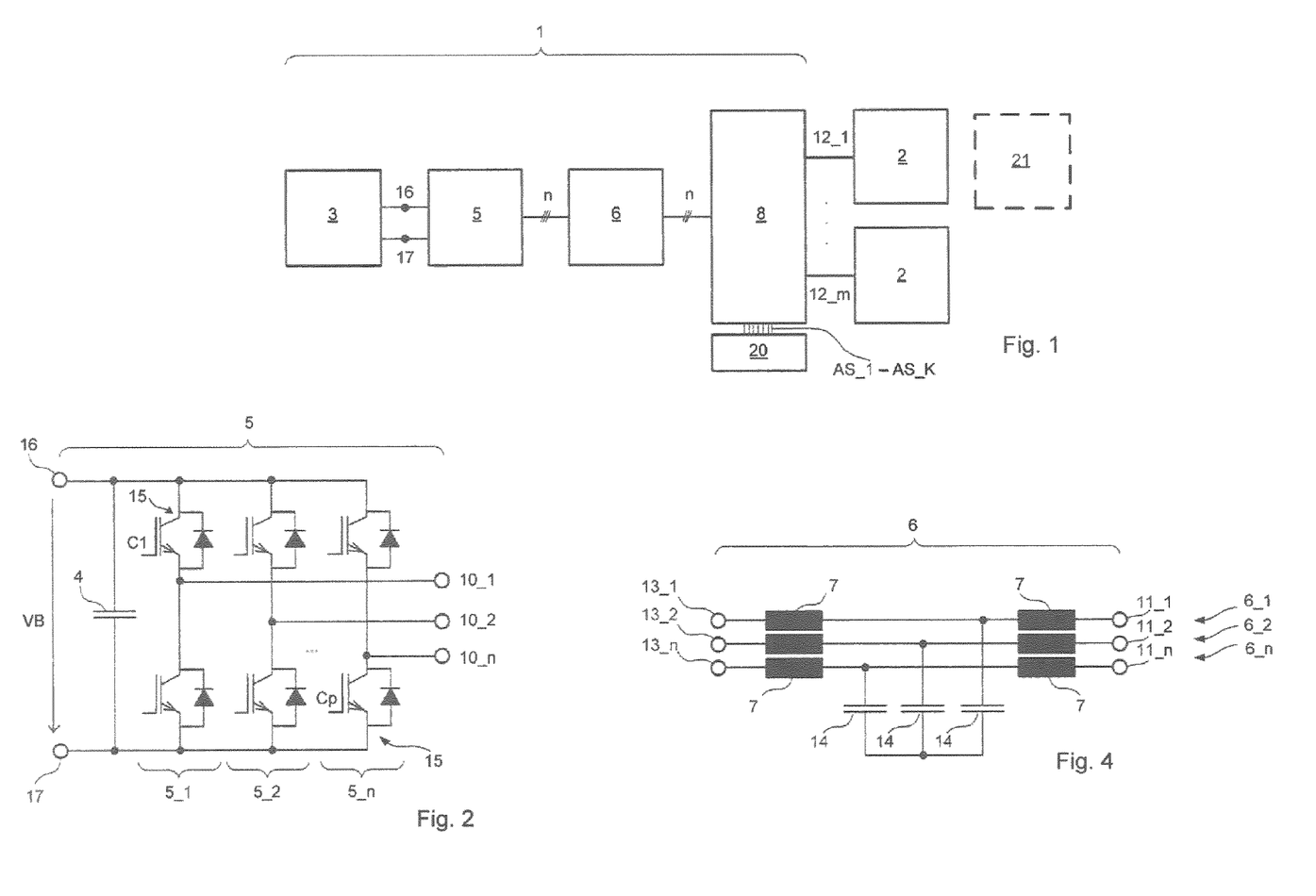
FIG. 1 shows a block diagram of an outline layout of a charging system according to the invention.
FIG. 2 shows a number of inverter bridges of the charging system represented in FIG. 1, according to a first embodiment.
FIG. 4 shows a number of electrical filters of the charging system represented in FIG. 1.

FIG. 1 shows a block diagram of an outline layout of a charging system 1. The charging system 1 can be a portable charging system which, for example, can be arranged in a motor vehicle, for example in the form of a private car.

The charging system 1 comprises an optional electrical energy supply accumulator 3 in the form of a battery, which delivers an operating voltage of approximately 800 V.

The charging system 1 further comprises a number m of connections 12_1, . . . , 12_m for the connection of electric energy accumulators 2 to be charged. The electric energy accumulators 2 can be, for example, batteries of at least partially electrically-propelled motor vehicles.

One or more connections of the number m of connections 12_1, . . . , 12_m can also be connected to an electricity supply grid 21 wherein, in this case, electrical energy from the energy supply accumulator 3 can be injected into the electricity supply grid 21 or, conversely, electrical energy from the supply grid 21 can be injected into the energy supply accumulator 3.

In the present exemplary case, two electric energy accumulators 2 are represented, which can simultaneously be charged by means of the charging system 1, as described in greater detail hereinafter. It is understood that, depending upon the dimensioning of the charging system 1, more than two electric energy accumulators 2 can also be charged simultaneously.

For example, the charging system 1, in a first exemplary dimensioning stage, can comprise m=8 connections 12, of which four connections respectively can be combined in a plug-in connector.

Figure 3:
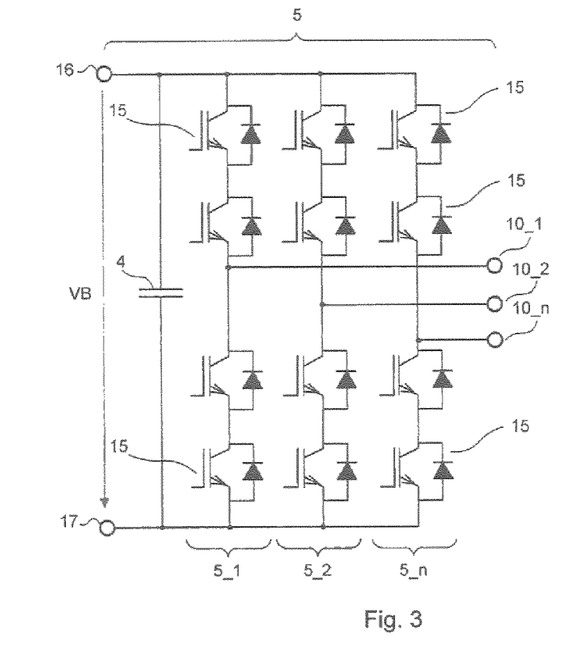
FIG. 3 shows a number of inverter bridges of the charging system represented in FIG. 1, according to a further embodiment.

The charging system 1 further comprises an inverter unit 5 which, with reference to FIGS. 2 and 3, comprises a number n of at least three inverter bridges 5_1, . . . 5_n. In the forms of embodiment represented, the number n, for example, can be 6.

With reference to FIG. 2, each of the inverter bridges 5_1, . . . , 5_n comprises two actuatable semiconductor switching devices 15, which are series-connected between poles 16 and 17. The semiconductor switching devices 15 are actuated by means of actuation signals C1 to Cp, wherein the actuation signals C1 to Cp are generated by a control unit 20. A positive intermediate circuit potential is present on pole 16, and a negative intermediate circuit potential is present on pole 17, wherein the potential difference between the two poles 16, 17 constitutes an intermediate circuit voltage VB, which is buffered by means of an intermediate circuit capacitor 4. This intermediate circuit voltage VB is that voltage which is output by the electrical energy accumulator 3 or the battery. In consequence, the respective inverter bridges 5_1, . . . 5_n are supplied from the energy supply accumulator 3.

Alternatively or additionally to the supply of the inverter bridges 51, . . . , 5_n from the energy supply accumulator 3, the intermediate circuit voltage can also be generated by means of an unrepresented electric generator which, for example, can be driven by a combustion engine of a motor vehicle or private car.

The inverter bridges 5_1, . . . , 5_n respectively comprise a center tap 10_1, . . . 10_n, which corresponds to an electrical connection point of the respective semiconductor switching devices 15.

The inverter unit 5 represented in FIG. 3 comprises inverter bridges 51, ..., 5_n, each having four actuatable semiconductor switching devices 15, which are series-connected between the poles 16 and 17. It is understood that any respective inverter bridge can also comprise more than four semiconductor switching devices.

With reference to FIG. 4, the charging system 1 further comprises a filter unit 6 having a number n of electrical filters 6_1, ..., 6_n. A respective electrical filter 6_1, ..., 6_n comprises an input 131, ..., 13_n. A respective input 13_1, ..., 13_n is electrically connected to a respectively associated center tap 101, ..., 10_n of one of the inverter bridges 5_1, ..., 5_n. This means that the input 131 is connected to the center tap 101, the input 132 is connected to the center tap 10_2, etc.

A respective filter 6_1, ..., 6_n comprises two reactance coils 7 and a capacitor 14 in a PI topology.

Figure 5:
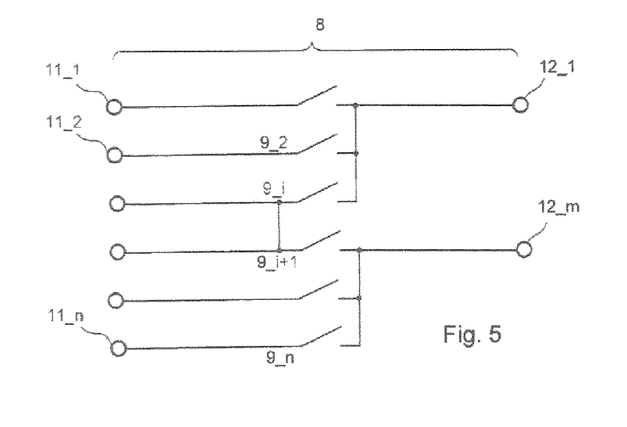
FIG. 5 shows a controllable assigning unit of the charging system represented in FIG. 1, according to a first embodiment.
Figure 6:
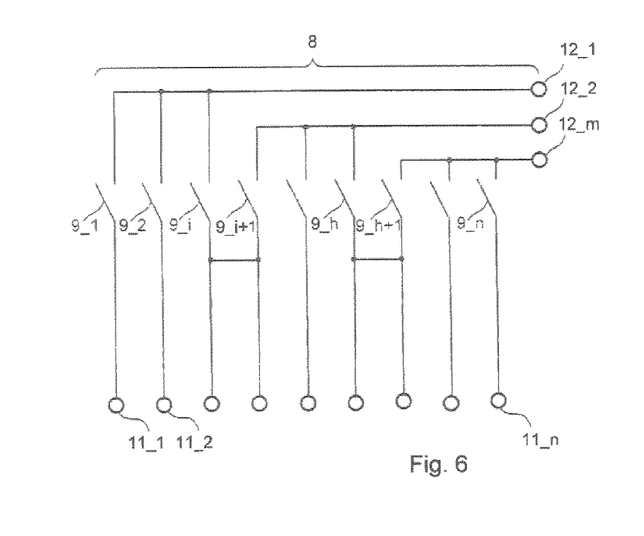
FIG. 6 shows a controllable assigning unit of the charging system represented in FIG. 1, according to a further embodiment.

With reference to FIGS. 1, 5 and 6, the charging system 1 further comprises a controllable assigning unit 8 which is interpolated between the outputs 11_1, ..., 11_n of the filters 6_1, ..., 6_n and the connections 12_1, ..., 12_m.

The controllable assigning unit 8 is designed, according to a number k of actuation signals AS_1, ..., AS_k, to electrically connect a respective output 11_1, ..., 11_n of a filter 6_1, ..., 6_n with one of the respectively associated connections 12_1, ..., 12_m, in a manner which will be described in greater detail hereinafter. The number k can be equal to the number n, or equal to the number m, or different from n and m.

The control unit 20 of the charging system 1 is designed to generate the actuation signals AS_1, ..., AS_k in accordance with a desired charging mode of the charging system 1.

With reference to FIGS. 5 and 6, the assigning unit 8 comprises a number of actuatable switching devices 9 in the form of contactors, which are actuated by the control unit 20 in accordance with a desired charging mode of the charging system 1, and which assume a charging mode-dependent circuit state.

The circuit state of the actuatable switching devices 9 is appropriately set by means of the actuation signals AS_1, ..., AS_k. The number k of actuation signals AS_1, ... AS_k can be identical to the number of switching devices.

By means of the charging system 1, in a first charging mode, for example, two electric energy accumulators 2 can be simultaneously charged with alternating current. The electric energy accumulators 2 can simultaneously be charged in three phases, can simultaneously be charged in a single phase or, in a mixed arrangement, one of the electric energy accumulators 2 can be charged in three phases, and the other electric energy accumulator 2 can be charged in a single phase.

Figure 7:
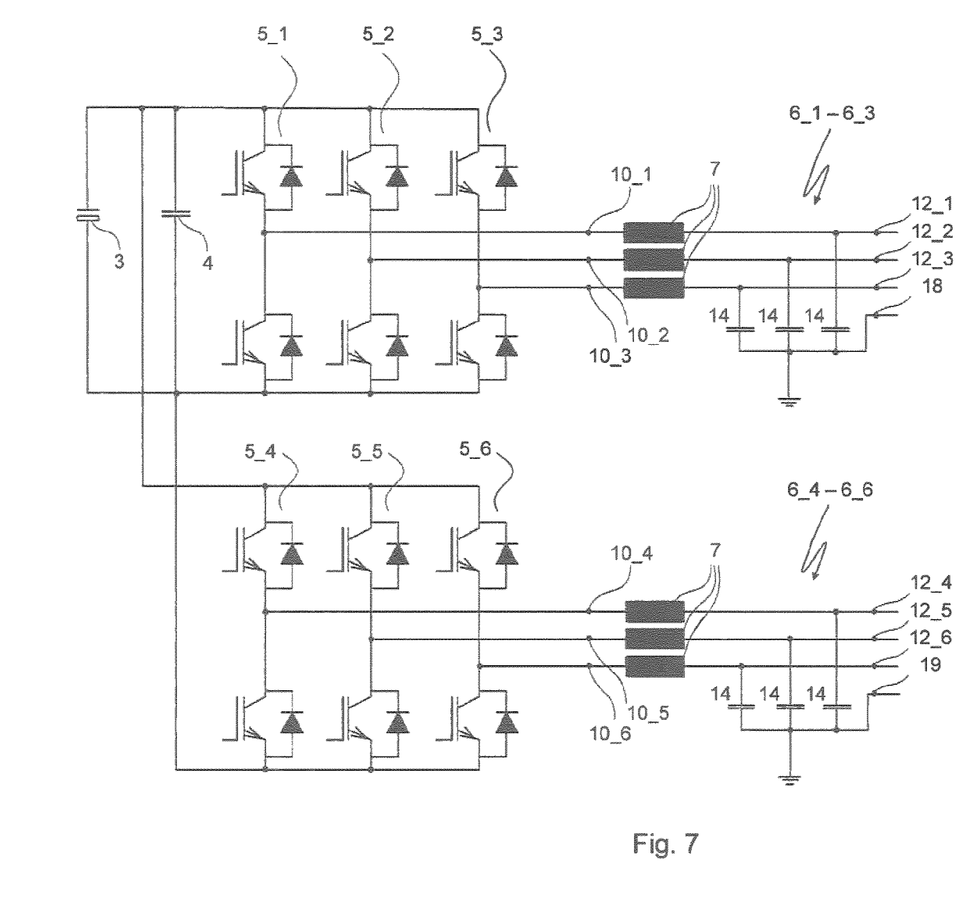
FIG. 7 shows the charging system in a first charging mode.

FIG. 7 shows a schematic representation of the charging system 1 in the first charging mode, with the corresponding circuit state of the switching devices 9 of the controllable assigning unit 8. The assigning unit and the switching devices 9 thereof, in the interests of greater clarity, are not represented here, but only the resulting electrical associations of filter outputs with the connections 12_1 to 12_6. In this case, for exemplary purposes, each of the filters 6_1 to 6_6 comprises only one reactance coil 7.

The circuit states of the switching devices 9 of the controllable assigning unit 8 are selected such that the bridge arms 5_1 to 5_3 constitute a first three-phase inverter which, from the DC voltage supplied by the electrical energy supply accumulator 3, conventionally generates a three-phase AC charging voltage, which is outputted at the connections 12_1 to 12_3, and can be employed for the three-phase charging of a first electric energy accumulator 2. An optional connection 18 is further provided, which is connected to PE.

The circuit states of the switching devices 9 of the controllable assigning unit 8 are further selected such that the bridge arms 5_4 to 5_6 constitute a second three-phase inverter which, from the DC voltage supplied by the electrical energy supply accumulator 3, conventionally generates a three-phase AC charging voltage, which is outputted at the connections 12_4 to 12_6, and can be employed for the three-phase charging of a second electric energy accumulator 2. An optional connection 19 is further provided, which is connected to PE.

The connections 12_1, 12_2, 12_3 and 18 can be integrated in a plug-in connector. Correspondingly, the connections 12_4, 12_5, 12_6 and 19 can be integrated in a further plug-in connector.

Figure 8:
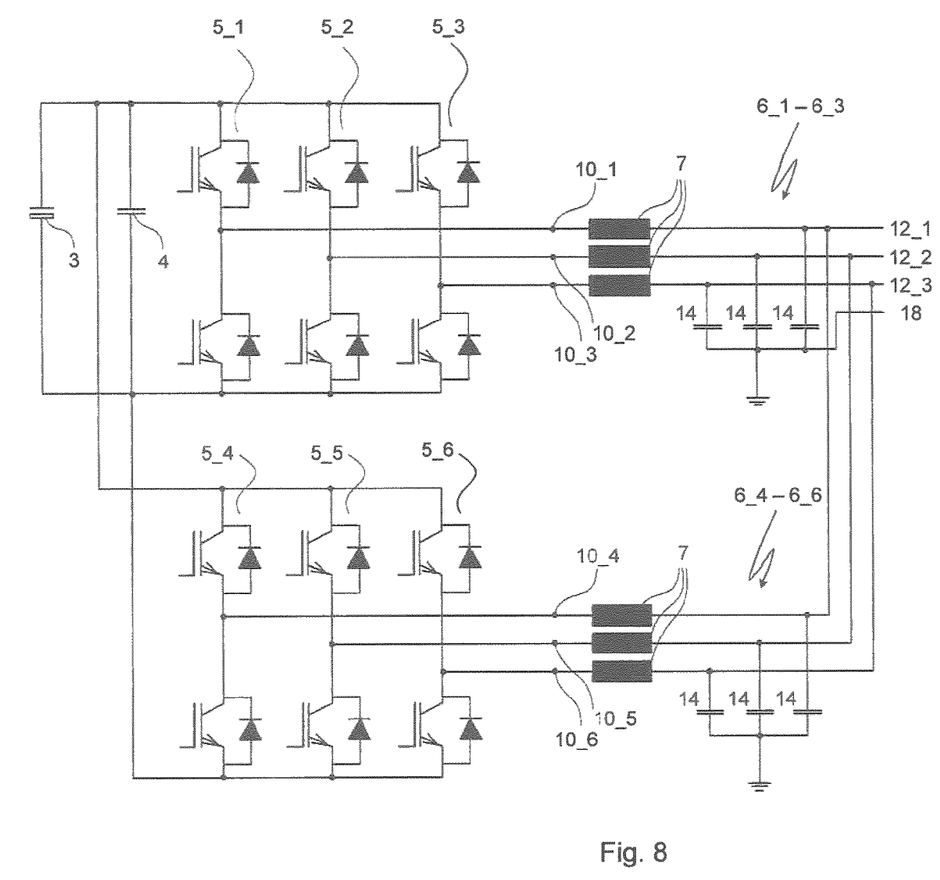
FIG. 8 shows the charging system in a second charging mode.

FIG. 8 shows a schematic representation of the charging system 1 in a second charging mode, with the corresponding circuit state of the switching devices 9 of the controllable assigning unit 8. The assigning unit and the switching devices 9 thereof, in the interests of greater clarity, are not represented here, but only the resulting electrical associations of filter outputs with the connections 12_1 to 12_3. In this case, for exemplary purposes, each of the filters 6_1 to 6_6 comprises only one reactance coil 7.

In the second charging mode, a single electric energy accumulator 2 can be charged with alternating current, wherein a charging current is higher than a charging current in the first charging mode.

In the second charging mode, two bridge arms respectively are connected via a corresponding filter to a common associated connection, i.e. are parallel-connected such that, in relation to the first charging mode, a higher charging current output is permitted. Accordingly, the bridge arms 5_1 and 5_4 are connected by means of their filters 6_1 or 6_4 to the connection 12_1, the bridge arms 5_2 and 5_5 are connected by means of their filters 6_2 or 6_5 to the connection 122, and the bridge arms 5_3 and 5_6 are connected by means of their filters 6_3 or 6_6 to the connection 12_3.

Figure 9:
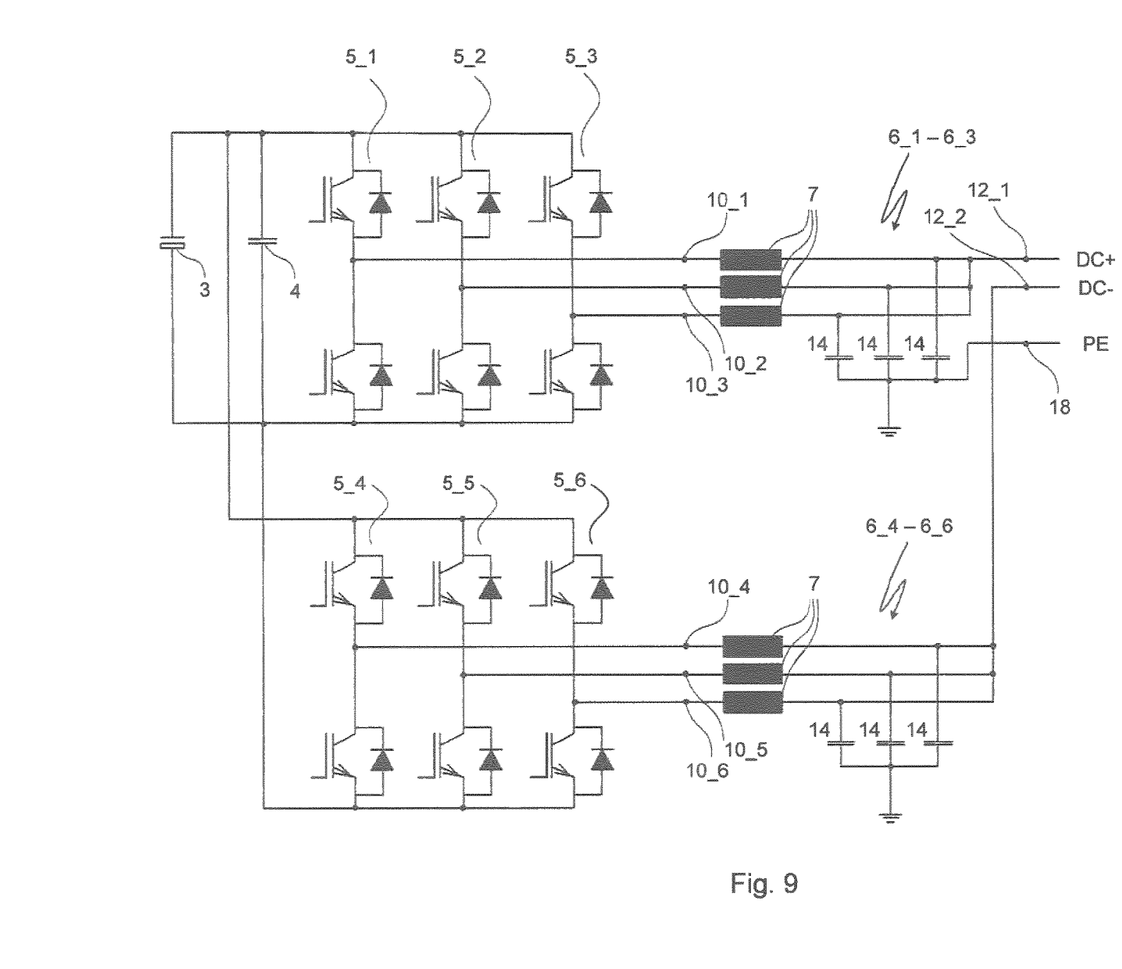
FIG. 9 shows the charging system in a third charging mode.

FIG. 9 shows a schematic representation of the charging system 1 in a third charging mode, with a corresponding circuit state of the switching devices 9 of the controllable assigning unit 8. The assigning unit and the switching devices 9 thereof, in the interests of greater clarity, are not represented here, but only the resulting electrical associations of filter outputs with the connections 12_1 and 12_2. In this case, for exemplary purposes, each of the filters 6_1 to 6_6 comprises only one reactance coil 7.

In the third charging mode, a single electric energy accumulator 2 can be charged with direct current to a maximum charging capacity.

In the third charging mode, the upper semiconductor switching devices 15 of the three bridge arms 5_1, 5_2, 5_3 are permanently conducting, and the lower semiconductor switching devices 15 of the three bridge arms 5_1, 5_2, 5_3 are permanently non-conducting. Accordingly, the pole 16 or the positive intermediate circuit potential is electrically connected via the upper switching devices 15 of the three bridge arms 5_1, 5_2, 5_3 and the reactance coils 7 of the filters 6_1, 6_2 and 6_3 to the connection 12_1.

Correspondingly, the upper semiconductor switching devices 15 of the three bridge arms 5_4, 5_5, 5_6 are permanently non-conducting, and the lower semiconductor switching devices 15 of the three bridge arms 5_4, 5_5, 5_6 are permanently conducting. Accordingly, the pole 17 or the negative intermediate circuit potential is electrically connected via the lower switching devices 15 of the three bridge arms 5_4, 5_5, 5_6 and the reactance coils 7 of the filters 6_4, 6_5 and 6_6 to the connection 12_2.

If the power flux is reversed, the inverter unit 5 can also be employed for the recharging of the electrical energy supply accumulator 3. To this end, the control unit 20 can generate the actuation signals AS_1, . . . , AS_k for the controllable assigning unit 8 and the further actuation signals C1, . . . , Cp for the semiconductor switching devices 15, such that the energy supply accumulator 3 is charged by means of electrical energy which is made available on one or more of the connections 12_1, . . . , 12_m.

The control unit 20 can be designed to generate all actuation signals such that a zero-current switching of the switching devices 9 of the assigning unit 8 is permitted, as a result of which the switching devices 9 can be dimensioned with a low switching capacity.

Additionally, overload protection of the switching devices 9 can be achieved by means of integrated current measurement in the inverter bridges.

The control unit 20 can be configured for communication with the energy supply accumulator 3 and all the connected electric energy accumulators 2, and can control the inverter unit 5 such that the required power (voltage and current) is delivered.

According to the invention, by the parallel connection of bridge arms as required, an AC charging current can be increased, as a result of which a rapid charging of electric vehicle energy accumulators is permitted. Correspondingly, by the parallel connection of bridge arms, a DC charging current can be increased.

The charging system according to the invention further permits the recharging of the energy supply accumulator 3 using a conventional three-phase industrial socket connection.

What is claimed is:

1. A charging system, comprising:
    a number m of connections for connecting at least one electric energy accumulator to be charged;
    a number n of at least three inverter bridges, each of which comprises a center tap;
    a number n of electrical filters, wherein one input of a respective filter of the number n of filters is electrically connected to a respectively associated center tap of an inverter bridge of the number n of inverter bridges;
    a controllable assigning unit, which is interpolated between a respective output of one filter of the number n of filters and the number m of connections and is designed, depending upon at least one actuation signal, to electrically assign a respective output of one filter of the number n of filters to a respectively associated connection of the number m of connections; and
    a control unit, which is designed to generate the at least one actuation signal, in accordance with a desired charging mode of the charging system,
    wherein the charging system comprises modes of:
    (a) simultaneous charging of a plurality of electric energy accumulators with alternating current,
    (b) charging of at least one energy accumulator with alternating current, wherein a charging current in charging mode (b) is higher than a charging current in charging mode (a),
    (c) simultaneous charging of a plurality of electric energy accumulators with direct current,
    (d) charging of at least one electric energy accumulator with direct current, wherein a charging current in charging mode (d) is higher than a charging current in charging mode (c), and
    wherein the desired charging mode is selected from one of: (a), (b), (c), or (d).

2. The charging system according to claim 1, further comprising:
    an energy supply accumulator which is designed to electrically supply the number n of inverter bridges.

3. The charging system according to claim 1, wherein a respective filter of the number n of filters comprises at least one reactance coil and a capacitor.

4. The charging system according to claim 2, wherein the control unit is designed to generate the at least one actuation signal for the controllable assigning unit and further actuation signals for switching devices of the inverter bridges, such that the energy supply accumulator is charged by way of electrical energy which is made available on one or more connections of the number m of connections.

5. The charging system according to claim 2, wherein the control unit is designed to generate the at least one actuation signal for the controllable assigning unit and further actuation signals for switching devices of the inverter bridges, such that electrical energy which is stored in the energy supply accumulator is injected into an electricity supply grid, which is connected to one connection or a plurality of connections of the number m of connections.

6. The charging system according to claim 2, wherein the energy supply accumulator supplies a voltage at a level which is higher than the level of a voltage which is delivered by a charging energy accumulator.

7. The charging system according to claim 1, wherein the assigning unit comprises a number of actuatable switching devices.

8. The charging system according to claim 7, wherein the actuatable switching devices are contactors.

9. The charging system according to claim 4, wherein the control unit is designed to generate the at least one actuation signal for the controllable assigning unit and further actuation signals for switching devices of the inverter bridges, such that electrical energy which is stored in the energy supply accumulator is injected into an electricity supply grid, which is connected to one connection or a plurality of connections of the number m of connections.

* * * * *